Nov. 29, 1955 P. WEINTRAUB 2,725,230
LIGHT PROJECTING APPARATUS
Filed Sept. 9, 1954 4 Sheets-Sheet 1

INVENTOR.
PHILIP WEINTRAUB
BY Clarence E. Thredy
HIS ATTORNEY.

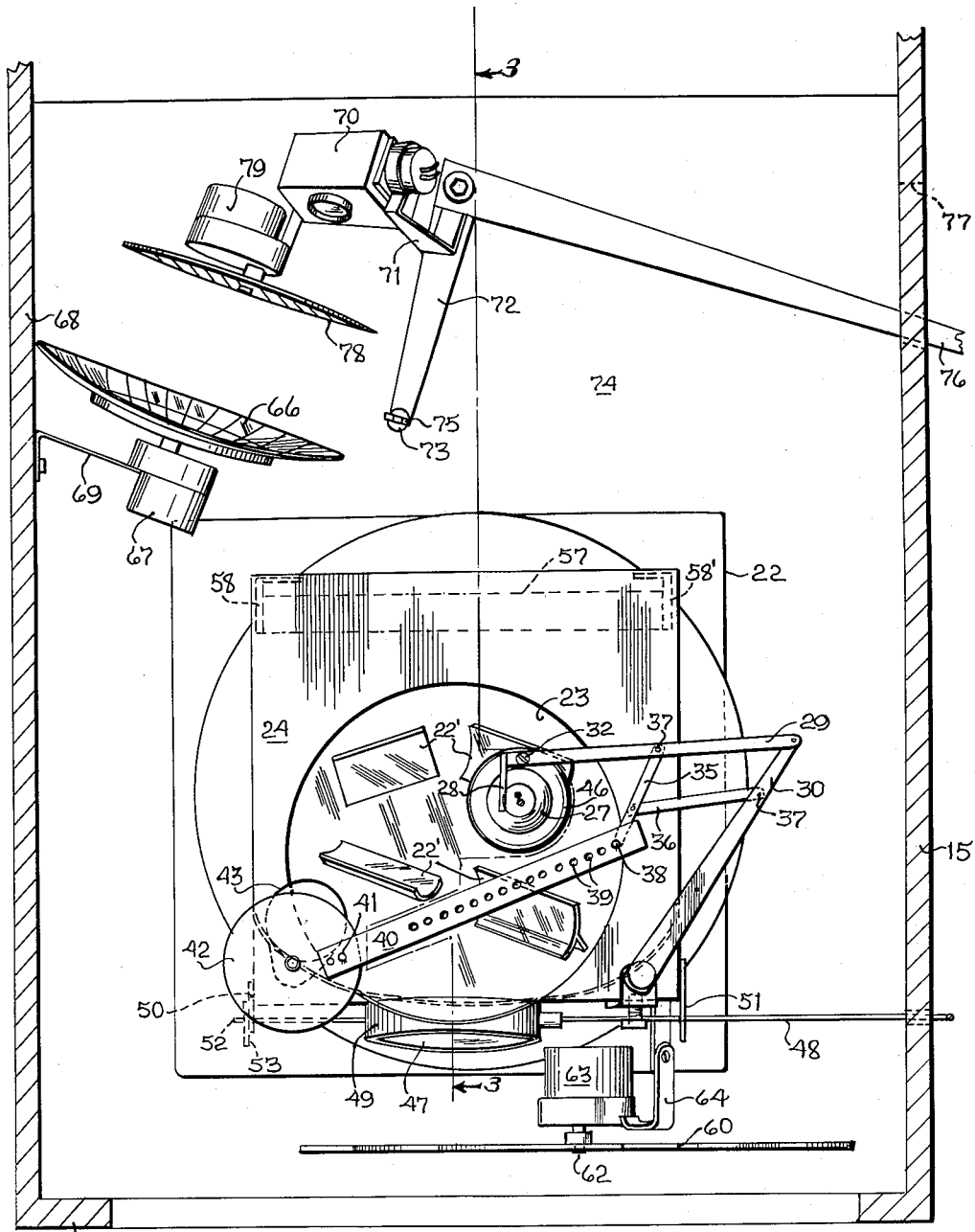

Nov. 29, 1955  P. WEINTRAUB  2,725,230
LIGHT PROJECTING APPARATUS
Filed Sept. 9, 1954  4 Sheets-Sheet 3
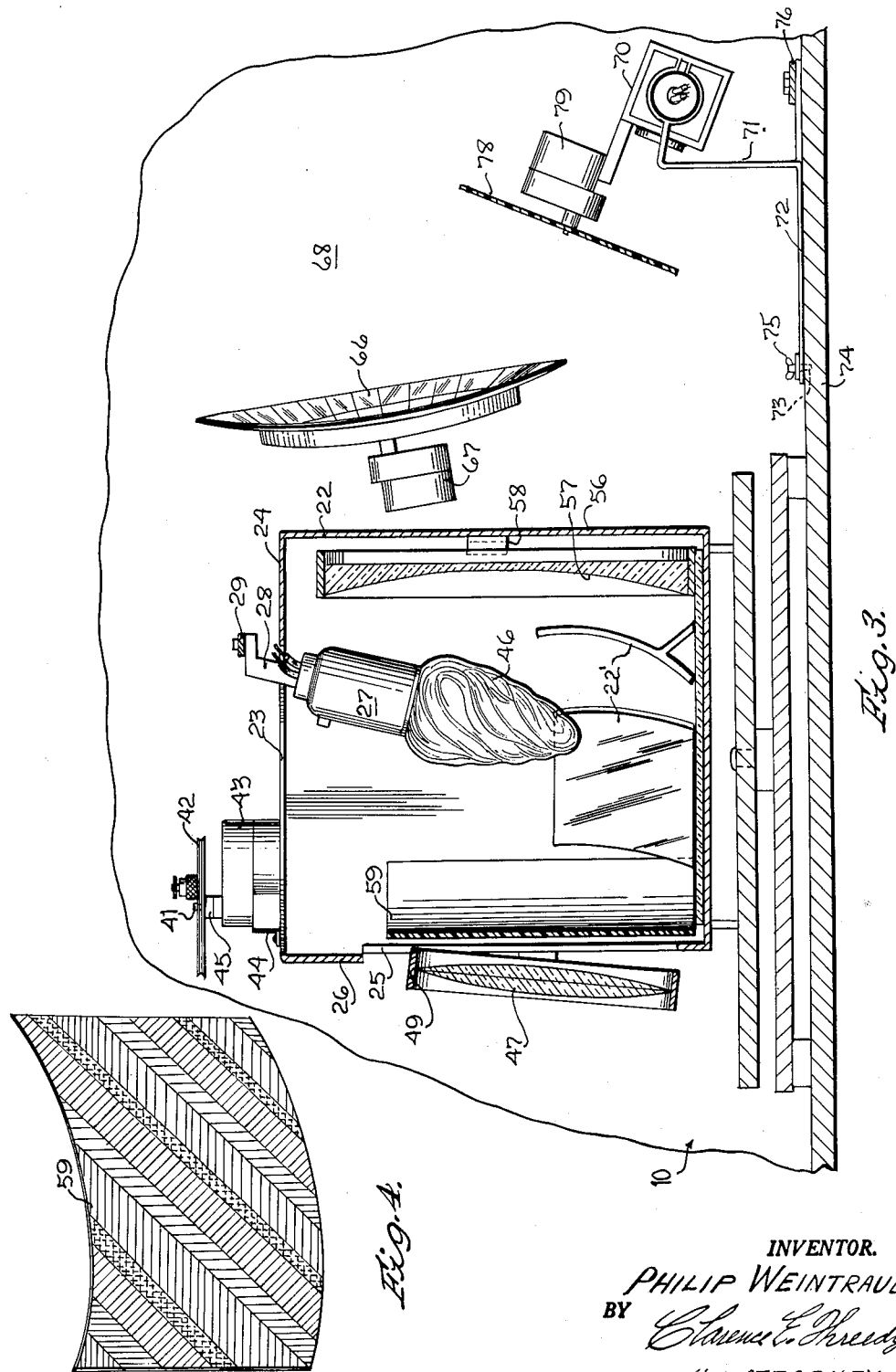
INVENTOR.
PHILIP WEINTRAUB
BY Clarence E. Threedy
HIS ATTORNEY.

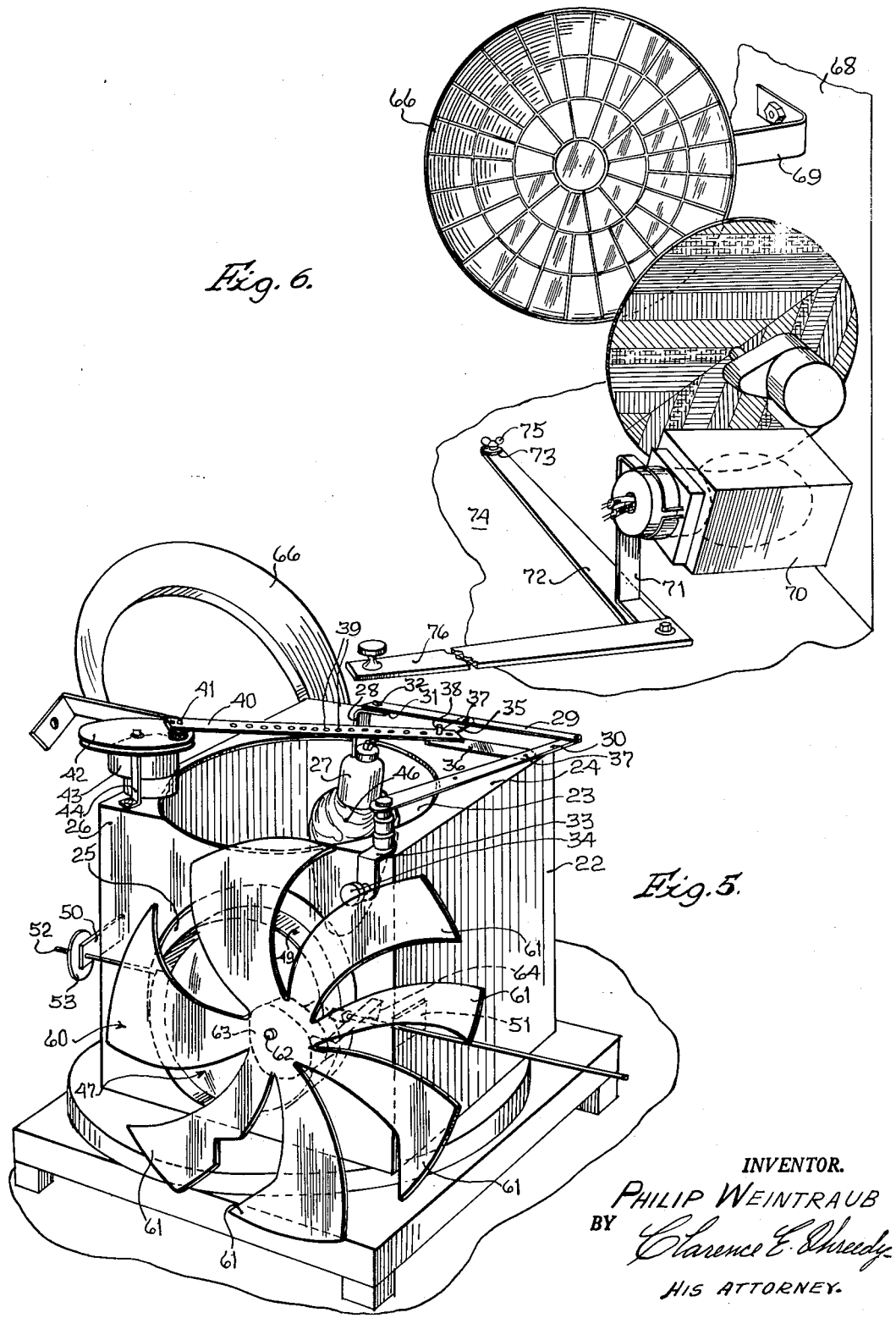

United States Patent Office 2,725,230
Patented Nov. 29, 1955

2,725,230

LIGHT PROJECTING APPARATUS

Philip Weintraub, Chicago, Ill., assignor to Weintraub Laboratories, Inc., Chicago, Ill., a corporation of Illinois Application September 9, 1954, Serial No. 454,928

4 Claims. (Cl. 272—10)

This invention relates to a new and useful improvement in a light projecting apparatus.

The principal object of my invention is the producing of endless variations of light, shadows and colors upon a screen or suitable background, these lights, shadows and colors being projected in changing patterns, designs, and tones yielding harmonious or contrasting patterns of various sorts, enhanced by the progressive changes of the color tones, patterns, shapes and shadows.

A further object of my invention is the arrangement of a fully adjustable optical system comprising lenses, light sources, light reflecting elements and colored light transmitting sheets, all positioned within the apparatus and actuated by the operator thereof.

A still further object of my invention is the provision of independent light sources which have their paths of light reflected upon a screen common to the light sources.

Another object of my invention is the provision of an open end enclosure for one of the light sources, with that light source movable within the confines of the enclosure.

Still another object of my invention is the provision of a plurality of color bearing members intercepting the paths of light from the light sources, with one of the color bearing members carried by one of the light sources and rotatable with respect thereto.

Still another and equally important object of my invention is the provision of a rotatable fan having variously formed vanes for periodically interrupting the path of light from the movable light source.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 2 is a top plan view of a portion of my invention showing the light sources and their relation with respect to each other;

Fig. 3 is a fragmentary sectional detail view taken substantially on line 3—3 of Fig. 2;

Fig. 4 is a perspective view of the color bearing member as employed in my apparatus;

Fig. 5 is a perspective view of the enclosure for one of the independent light sources of my invention;

Fig. 6 is a fragmentary view of the remaining light source and its reflectors.

Figure 1:
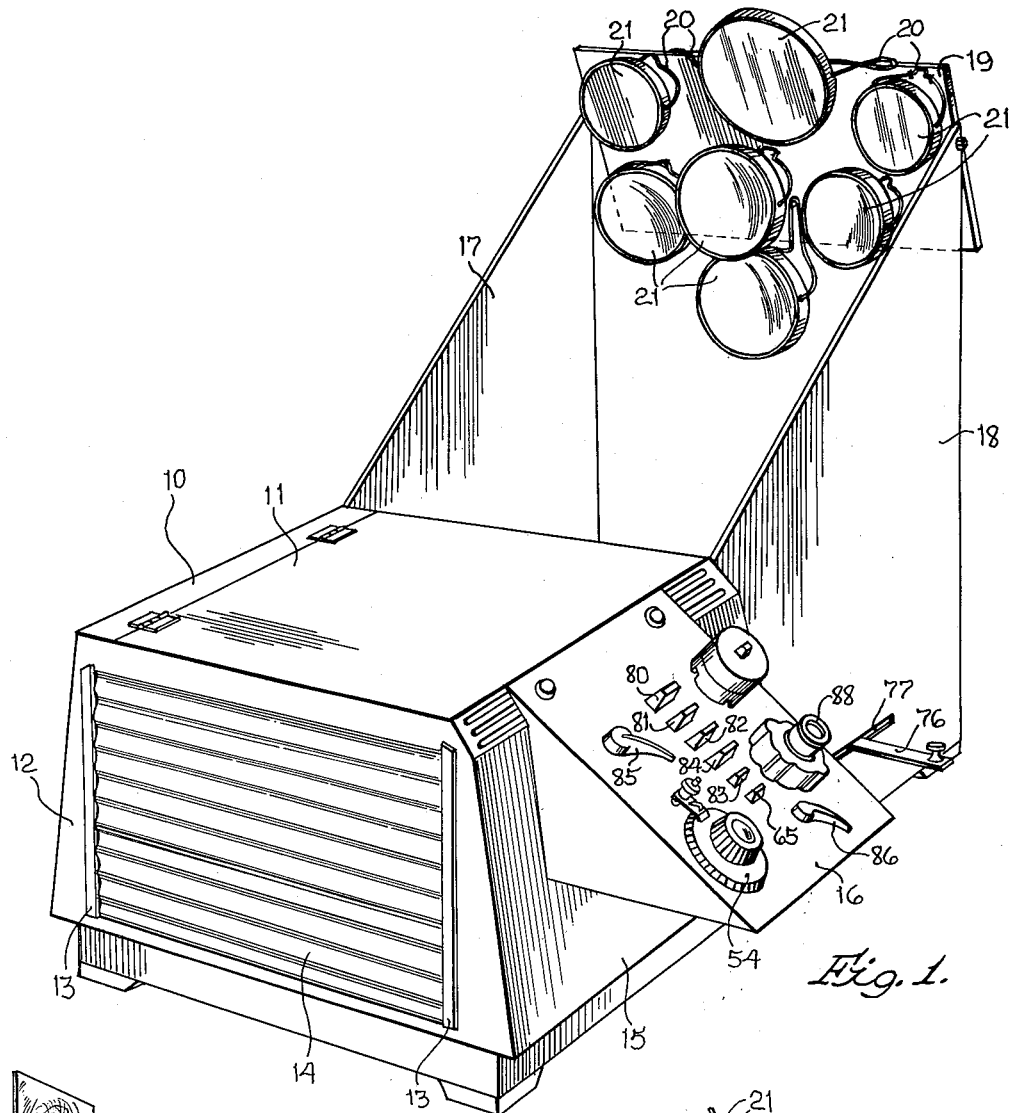
Fig. 1 is a perspective view of my light projecting apparatus.

The apparatus to be described herein has been found acceptable for many practical uses. It may be operated for entertainment or for interpretative purposes alone or in connection with music, ballet or dramatic productions. Its operation has an established practical utility in connection with phychological treatment and study. As an advertising apparatus or background producer, it has proven successful, notably in the field of television.

The apparatus is contained in an open back cabinet 10. This cabinet 10 has a hinged top wall 11 and an open front wall 12. The front wall 12 is provided with vertically extending retaining strips 13, which strips form a passage for the insertion of a ribbed or fluted glass panel 14. On one side wall 15 is mounted a control panel 16. This panel contains the various actuating switches and rheostat controls for the electric motors and lights as contained in my apparatus.

Extending rearwardly from the cabinet 10, are two side panels 17 and 18. These panels are so designed that they present a raised support to which is pivotally attached a backboard 19. This backboard 19 has pivotally mounted thereon in any suitable manner, such as by wire brackets 20, as shown, a plurality of mirrors 21, each having a convex and a concave reflecting surface.

Positioned within the cabinet 10 directly to the rear of the glass panel 14 is one of the apparatus' light sources and its projection housing 22. This housing 22 has a circular opening 23 formed in the top 24 thereof and a like circular opening 25 formed in its front wall 26. Through the opening 23 formed in the top 24 of this housing 22 projects a light socket 27. This light socket 27 is suspended within the housing from an L-shaped supporting bracket 28 carried by a pantograph structure. This structure comprises, in addition to the supporting bracket 28, arms 29 and 30. One end of the arm 29 is fixedly connected to the supporting bracket 28 as at 31 in any suitable manner such as by a screw 32 as shown. The opposite end of the arm 29 is pivotally connected to one end of the other arm 30. The opposite end of the arm 30 is pivotally attached to a bracket 33. The bracket 33 is fixedly attached to the housing 22 by means of a thumb screw 34 which threads into a threaded bore formed into the front wall of the housing. Extending in converging directions from the arms 29 and 30 are supporting links 35 and 36. These links are pivotally connected to their respective arms 29 and 30 in any suitable manner such as by loose rivets 37 as shown in the drawings. The link 30 is pivotally connected in a like manner to the link 35. At the free end of the link 35 there is an upwardly extending pin 38, which pin is adapted to be inserted in any of the apertures 39 formed in an actuating bar 40. The opposite end of the bar 40 is connected in a like manner to a pin 41 carried on the peripheral edge of a rotatable disc 42 of a motor 43. The motor 43 is carried by the housing 22 and is attached thereto by an L-bracket 44 as shown in Figs. 3 and 5.

Upon energization of the motor 43, the disc 42 through the driven shaft 45 will be rotated. This motion is transmitted to a light 46 carried by the socket 27 through the actuating bar 40 and the arms 29 and 30. The circumference of the revolution of the light 46 is adjustable by the positioning of the bar 40 with respect to the pins 38 and 41 of the link 36 and disc 42 respectively.

Immediately in front of the opening 25 formed in the front wall of the housing is positioned a projecting lens 47. This lens is pivotable about a horizontally extending rod 48, which rod connects to the metal peripheral edging 49 of the lens mounting as shown in Figs. 2 and 5. The rod 48 is journaled through brackets 50 and 51 carried by the side walls of the housing 22. At one end 52 of the rod 48, adjacent the brackets 50 is a stop washer 53 which restricts lateral displacement of the rod 48 with respect to these brackets. The other end of the rod 48 passes through the side wall 15 of the cabinet 10 and is connected to a control knob 54 carried by the control panel 16. The turning of the knob 54 will cause the lens 47 to rotate about the horizontal axis of the rod 48 and the illumination passing through the lens 47 will be distorted thereby so as to cause desired projections of varying designs.

Figure 7:
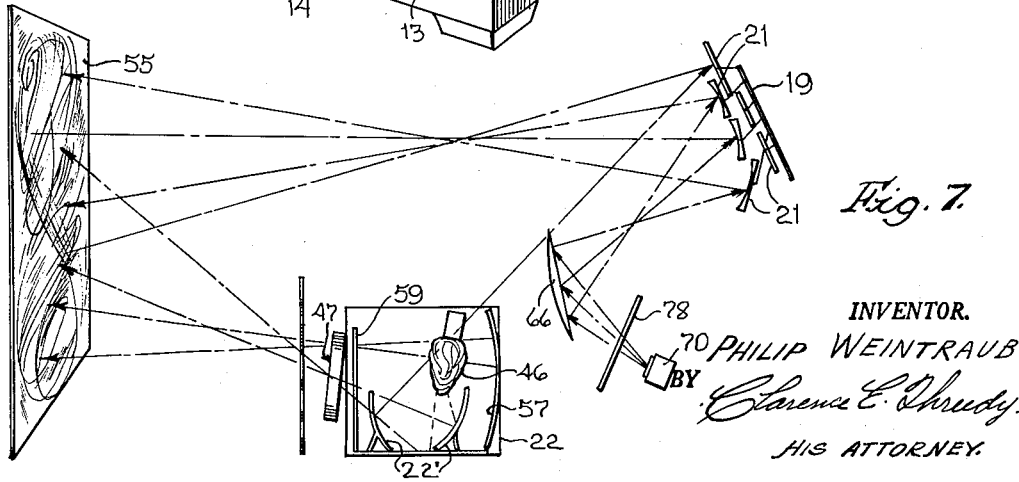
Fig. 7 is a diagrammatical view showing in dotted lines the light paths of my light projecting apparatus.

Within the housing 22 there is positioned a plurality of reflecting surfaces 22', such as mirrors and light prisms. These objects will receive the light from the lamp 46 and will in turn reflect the light path out through the lens 47 upon a suitable screen 55 much like the diagrammatic depiction of Fig. 7.

It should be understood that by changing the position of these objects the reflected result is likewise changed. Therefore, I feel that it is within the scope of my invention to state that these objects like the lens 47 may be connected to adjusting means whereby they can be positioned automatically from a suitable control carried by the control panel 16. In an endeavor to insure a proper reflection of the light paths from within the housing 22, I have provided on the back wall 56 of such housing a concaved faced mirror 57. This mirror is held in place by brackets 58 and 58', such as are shown in Figs. 2 and 3. To the rear of the front wall 26 of the housing 22 and covering the opening 25, I have provided a multicolor bearing light penetrating sheet 59. Such a sheet is shown in a perspective view in Fig. 4 and is shown in its desired position in Figs. 2 and 3.

For the best results, I have determined that it is advisable to use a light shaped in the form of a candle flame. Such a light is common in use and well known in the trade.

To impart motion to the light, shadows and colored patterns as projected by my apparatus, I employ a rotatable fan element 60. This fan has a plurality of laterally extending vanes 61 cut in odd shapes and notched at various points. The fan 60 is connected to a driven shaft 62 of a driving motor 63, which motor 63 is connected to the housing 22 by a bracket 64, as shown in Fig. 2. This motor 64 has operative connection to a control button 65 located on the panel 16 so that its operation is at all times under the control of the operator. This fan cooperates with the moving light 46 to produce the desired effects of my apparatus.

Cooperating with the mirrors 21 of the backboard 19, I provide a rotating multi-surface light reflector 66 which light reflector is substantially concave in cross section as shown in Figs. 2 and 3. This reflector 66, together with its driving motor 67 is connected to the side wall 68 of the cabinet 10 by means of a suitable bracket 69. To provide illumination of the reflector 66, I provide a light source 70 carried by a supporting arm 71 as shown in Fig. 2. This arm 71 is connected to a link arrangement 72. One end of the link arrangement is pivotally connected as at 73 to the base 74 of the cabinet 10 in any suitable manner such as by a screw 75 as shown. The other end of the link arrangement terminates into a handle 76 which extends out of a slot 77 formed in the side wall 15 of the cabinet 10. Such a construction permits the positioning of the light source 70 with respect to the reflector 64 so as to permit creation of different reflective patterns. To enhance the effect of these patterns, I include a multi-colored rotatable disc 78 carried by the driven shaft of a motor 79. This motor is attached to the light source 70 as viewed in Figs. 2 and 6. The motors 67 and 79, as well as the light source 70, are operatively connected to the control buttons 80, 81, and 82 respectively as carried by the panel 16.

On the control panel 16 there are located, in addition to the buttons 65, 80, 81 and 82, buttons 83 and 84 which control the motor 43 and the light 46, respectively. There also are included two rheostat controls 85 and 86 for controlling the brilliancy of the light sources 46 and 70. I also provide on the control panel 16 a master switch 87 and a circuit control fuse 88 together with the control knob 54 of the lens 47.

From the aforesaid description, it is apparent that the operator of this apparatus can readily change the patterns which are projected upon a screen or suitable background. The brilliancy of the light sources can be controlled by the rheostats. The movement of the patterns as projected may be controlled by the disc 78 and the reflectors 66. The same effect or additional effects can be achieved by operation of the fan 60. All these features combined with the adjustment of the lens 47 and the mirrors 21 of the backboard 19 afford numerous variations in projecting color patterns, movements and color tones as desired by the operator.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A light projecting apparatus comprising spaced independent light sources, means for reflecting light rays from said light sources along separate paths to a screen common to said light sources, an enclosure having an open end for one of said light sources, means for rotating said one of said light sources within said enclosure relative to the open end thereof, means for adjusting the rotation of said movable light source within said enclosure, means within said enclosure for reflecting said light rays from said movable light source, transparent members intercepting the path of light from said light sources, each of said members comprising a plurality of sectors of contrasting colors, means for rotating one of said color bearing members, and means for simultaneously operating said movable light source and said color bearing members.

2. A light projecting apparatus comprising spaced independent light sources, means for reflecting light rays from said light sources along separate paths to a screen common to said light sources, an enclosure having an open end for one of said light sources, means for rotating said one of said light sources within said enclosure relative to the open end thereof, means for adjusting the rotation of said movable light source within said enclosure, means within said enclosure for reflecting said light rays from said movable light source, a projecting lens carried by said enclosure adjacent the open end thereof for projecting said reflected light rays from said movable light source and reflecting means, means for rotating said lens about a horizontal axis for distorting said projected reflected light rays, transparent members intercepting the path of light from said light sources, each of said members comprising a plurality of sectors of contrasting colors, means for rotating one of said color bearing members, and means for simultaneously operating said movable light source and said one of said color bearing members.

3. An apparatus for projecting independent light rays of various colored characteristics upon a screen for blending and merging thereupon comprising, a plurality of independent light sources, an adjustable projecting lens carried by said apparatus intercepting the path of light from one of said light sources, means for rotating said lens about a horizontal axis for distorting the intercepted light path from said one of said light sources, sectors of contrasting colors intercepting the paths of light from said sources for changing the patterns and tones of light projected from said light sources through said sectors upon said screen, and means for rotating one of said light sources within and over the area of said screen, and means for simultaneously rotating said projecting lens and said one of said light sources.

4. An apparatus for projecting independent light rays of various colored characteristics upon a screen for blending and merging thereupon comprising, a plurality of independent light sources, an adjustable projecting lens carried by said apparatus intercepting the path of light from one of said light sources, means for rotating said lens about a horizontal axis for distorting the intercepted light path from said one of said light sources, sectors of contrasting colors intercepting the path of light from said sources for changing the patterns and tones of light projected from said light sources through said sectors upon said screen, a rotatable fan having a plurality of vanes periodically intercepting the path of light from one of said light sources, and means for rotating one of said light sources within and over the area of said screen, means for adjusting the rotation of said one of said light sources, and means for simultaneously rotating said one of said light sources and said lens and said fan.

References Cited in the file of this patent

UNITED STATES PATENTS

| Number | Name | Date |
|---|---|---|
| 1,406,663 | Lovstrom | Feb. 14, 1922 |
| 1,549,778 | Lovstrom | Aug. 18, 1925 |
| 1,613,562 | Frost | Jan. 4, 1927 |
| 1,749,011 | Wilfred | Mar. 4, 1930 |
| 1,758,589 | Wilfred | May 13, 1930 |
| 1,973,454 | Wilfred | Sept. 11, 1934 |
| 2,059,361 | Kenworthy | Nov. 3, 1936 |
| 2,151,735 | Bresser | Mar. 28, 1939 |
| 2,169,022 | Chubb | Aug. 8, 1939 |
| 2,339,169 | Hutter | Jan. 11, 1944 |